United States Patent
Lim et al.

(10) Patent No.: US 10,374,446 B2
(45) Date of Patent: Aug. 6, 2019

(54) BATTER PACK INCLUDING CARBON HEATER

(71) Applicant: LG CHEM, LTD., Seoul (KR)

(72) Inventors: Jong Min Lim, Daejeon (KR); Sang Jin Ahn, Daejeon (KR)

(73) Assignee: LG Chem, Ltd., Seoul (KR)

( * ) Notice: Subject to any disclaimer, the term of this patent is extended or adjusted under 35 U.S.C. 154(b) by 50 days.

(21) Appl. No.: 15/712,847

(22) Filed: Sep. 22, 2017

(65) Prior Publication Data
US 2018/0090949 A1    Mar. 29, 2018

(30) Foreign Application Priority Data

Sep. 23, 2016  (KR) ......................... 10-2016-0121850

(51) Int. Cl.
| | |
|---|---|
| H01M 10/613 | (2014.01) |
| H02J 7/00 | (2006.01) |
| H01M 10/615 | (2014.01) |
| H01M 10/625 | (2014.01) |
| H01M 2/10 | (2006.01) |
| H01M 2/30 | (2006.01) |
| H01M 10/0525 | (2010.01) |
| H02H 7/18 | (2006.01) |
| H01M 10/653 | (2014.01) |
| H01M 10/6551 | (2014.01) |

(52) U.S. Cl.
CPC ......... *H02J 7/0026* (2013.01); *H01M 2/1027* (2013.01); *H01M 2/30* (2013.01); *H01M 10/0525* (2013.01); *H01M 10/613* (2015.04); *H01M 10/615* (2015.04); *H01M 10/625* (2015.04); *H01M 10/653* (2015.04); *H01M 10/6551* (2015.04); *H02H 7/18* (2013.01); *H02J 7/0031* (2013.01); *H02J 7/0042* (2013.01); *H02J 7/0081* (2013.01); *H01M 2220/30* (2013.01); *H02J 2007/0037* (2013.01); *Y02T 10/7055* (2013.01)

(58) Field of Classification Search
CPC .......... H01M 10/052; H01M 10/0525; H01M 10/613; H01M 10/615
See application file for complete search history.

(56) References Cited

U.S. PATENT DOCUMENTS

| | | | |
|---|---|---|---|
| 2006/0210868 A1* | 9/2006 | Kim | ................... H01M 10/625 429/120 |
| 2015/0325892 A1* | 11/2015 | Yue | ........................ H05B 3/20 429/120 |

* cited by examiner

*Primary Examiner* — Olatunji A Godo
(74) *Attorney, Agent, or Firm* — Morgan, Lewis & Bockius LLP

(57) ABSTRACT

The present disclosure provides a battery pack including a battery cell array in which a plurality of battery cells are arranged in a state in which side surfaces thereof face each other, a heater disposed between the battery cells, a battery management system (BMS) configured to control an operation of the battery cells, and a temperature sensor configured to measure a temperature of the battery cells to transmit the measured temperature to the BMS. Here, when the temperature of the battery cells, which is measured from the temperature sensor, is equal to or less than a critical temperature, the BMS provides a current to the heater to increase the temperature of the battery cells.

19 Claims, 7 Drawing Sheets

BATTERY PACK INCLUDING CARBON HEATER

CROSS-REFERENCE TO RELATED APPLICATION

This application claims priority to Korean Patent Application No. 10-2016-0121850 filed on Sep. 23, 2016 and all the benefits accruing therefrom under 35 U.S.C. § 119, the contents of which are incorporated by reference in their entirety.

BACKGROUND

The present disclosure relates to a battery pack including a carbon heater.

Recently, as technical development and demands for mobile devices have increased, demands for rechargeable secondary batteries as energy sources are rapidly increasing, and thus more researches on the secondary batteries are being carried out to cope with such diverse demands. Also, the secondary batteries have attracted considerable attention as power sources for an electric vehicle (EV), a hybrid electric vehicle (HEV), and a plug-in hybrid electric vehicle (Plug-In HEV), which have been proposed as solutions to air pollution and the like caused by existing gasoline and diesel vehicles that use fossil fuels.

Therefore, the electric vehicle (EV) capable of traveling using only a battery and the hybrid electric vehicle (HEV) using a battery in combination with an existing engine, have been developed, some of which have been commercialized. For the secondary batteries as power sources for EVs and HEVs, nickel metal hydride (Ni-MH) batteries are commonly used. However, recent researches on using lithium secondary batteries having high energy density, high discharge voltage, and output stability are being actively carried out, some of which have reached commercialization.

When such secondary batteries are used as a vehicle power, the secondary batteries are used in the form of a battery pack including a plurality of battery cells, a battery module, or a battery module assembly.

However, when a lithium secondary battery is used under a low temperature environment, a performance thereof is degraded due to voltage drop, and thus, more power is consumed in comparison with that consumed in an ordinary temperature environment.

Due to the above-described limitation, when an electric vehicle using a lithium secondary battery as a power source travels at a low temperature, performance degradation such as reduction in output and decrease in traveling distance of the electric vehicle occurs.

Thus, there is a great need for technologies that can fundamentally solve the above-described limitations.

SUMMARY

The present disclosure provides solutions for the above-described limitations according to the related art and technical limitations requested from the past.

In detail, the present disclosure provides a battery pack capable of maintaining a normal performance of the battery by increasing a temperature of the battery equal to or greater than a predetermined temperature to prevent the performance of the battery from being degraded while an electric vehicle travels in a low temperature environment.

In accordance with an exemplary embodiment, a battery pack includes: a battery cell array in which a plurality of battery cells are arranged in a state in which side surfaces thereof face each other; a heater disposed between the battery cells; a battery management system (BMS) configured to control an operation of the battery cells; and a temperature sensor configured to measure a temperature of the battery cells to transmit the measured temperature to the BMS, in which, when the temperature of the battery cells, which is measured from the temperature sensor, is equal to or less than a critical temperature, the BMS provides a current to the heater to increase the temperature of the battery cells.

Accordingly, as the heater is disposed between the battery cells and the current is provided to the heater to increase the temperature of the battery cells when the temperature of the battery cells, which is measured from the temperature sensor, is equal to or less than the critical temperature, the battery pack in accordance with an exemplary embodiment may increase the temperature of the battery equal to or greater than a predetermined temperature even when the electric vehicle having the battery pack in accordance with an exemplary embodiment as a power source travels in the low temperature environment, and accordingly, prevent the performance of the battery from being degraded to secure the normal output and the operation time.

In an exemplary embodiment, the battery cell may include a pouch-type battery cell.

The pouch-type battery cell may have a structure in which an electrode assembly including a positive electrode, a negative electrode, and a separator disposed between the positive and negative electrodes is embedded in a battery case including an accommodation portion together with an electrolytic solution.

The electrode assembly may have a folding-type structure, a stack-type structure, a stack/folding-type structure, or a lamination/stack-type structure.

The electrode structures of folding-type, stack-type, stack/folding-type, and lamination/stack-type structures will be described below.

Firstly, a unit cell of the folding-type structure may be manufactured such that a separator sheet is placed between the positive and negative electrodes having a sheet shape, which are manufactured by applying a mixture including an electrode active material onto a metal collector, then drying, and pressing, and wound.

A unit cell of the stack-type structure may be manufactured such that a separator cut in a predetermined size corresponding to that of the positive electrode plate and the negative electrode plate is placed between the positive and negative electrode plates manufactured by applying an electrode mixture onto a metal collector, then drying, pressing, and cutting in a predetermined size, and stacked.

A unit cell of the stack/folding-type structure in which a positive electrode and a negative electrode face each other may be manufactured such that two or more unit cells in which two or more electrode plates are stacked are provided, the unit cells are wound by at least one separation film while not overlapped or the separation film is bent in size of the unit cell to be interposed between the unit cells.

In some cases, at least one single electrode plate may be further provided on an outer surface of the outermost unit cell or between arbitrary unit cells while the positive and negative electrodes face each other.

The unit cell may include an S-type unit cell in which both outermost electrode plates have the same electrode and a D-type unit cell in which both outermost electrode plates have opposite electrodes.

The S-type unit cell may be a SC-type unit cell in which both outermost electrode plates are positive electrodes and a SA-type unit cell in which both outermost electrode plates are negative electrodes.

A unit cell of the lamination/stack-type structure may be manufactured such that an electrode mixture is applied to each metal collector, then dried and pressed, then cut in a predetermined size, and then, a negative electrode, a separator above the negative electrode, a positive electrode, and a separator thereabove are sequentially stacked from a bottom.

The battery case may include a pouch-type case having the lamination structure including a metal layer and a resin layer.

As a detailed example of the battery case, the battery case is made of a laminate sheet including a resin outer layer with excellent durability, a metal layer with barrier properties, and a resin sealant layer with thermofusible properties, and the resin sealant layer may be thermally fused mutually.

Since the resin outer layer should have excellent resistance against external environment, the resin outer layer needs to have predetermined tensile strength and weatherability. To this end, a polyethylene terephthalate (PET) and an elongated nylon film may be used as a polymer resin of the resin outer layer.

The metal layer with barrier properties may be preferably made of aluminum in order to exert not only the function of improving the strength of the battery case but also the function of preventing introduction or leakage of foreign substances such as gas and moisture.

The resin sealant layer may be preferably made of a polyolefin-based resin, which has a thermofusible (heat-bondable) property, a low hygroscopic property to suppress permeation of an electrolytic solution, and prevents expansion or corrosion caused by the electrolytic solution. More preferably, the resin sealant layer may be made of non-elongated polypropylene (CPP).

The heater may have a rectangular sheet shape and size corresponding to an electrode assembly accommodation portion in which an electrode assembly of the battery cell is accommodated.

In an exemplary embodiment, the heater may include a carbon heating film.

In an exemplary embodiment, the carbon heating film may include: a composite film having a sheet shape; and strip-type conductive terminals provided on both ends of the composite film in a width direction of the sheet.

The composite film may have a rectangular shape and a size corresponding to an electrode assembly accommodation portion in which an electrode assembly of the battery cell is accommodated.

A width direction of the sheet on which the strip-type terminals are formed may represent a direction of a short side of the rectangular sheet.

The carbon heating film may emit heat due to resistance heat of a composite film when a current is applied to conductive terminals. Accordingly, battery cells may increase in temperature, so that the battery normally operates to prevent the battery from being degraded in a low temperature environment, when a temperature of the battery cell, which increases by the carbon heating film, is exceeded a critical temperature, the BMS block the current applied to the carbon heating film and limit heating of the film.

In an exemplary embodiment, terminal recessed portions at which the conductive terminals are positioned may be defined in one surface adjacent to both ends of the composite film in the width direction of the sheet. Accordingly, the conductive terminals may be mounted to the terminal recessed portions to apply a current to the composite film.

In another exemplary embodiment, the strip-type conductive terminals may be applied on the both ends of the composite film in a length direction of the sheet. Accordingly, the heater may have a more compact structure, and the conductive terminals may apply a current to the composite film.

In an exemplary embodiment, the heater may have a thickness of 50 µm to 100 µm.

When the heater has a thickness less than 50 µm, as heat generated from the heater is not sufficient, time for increasing a temperature of the battery cells to a target temperature may take long. Meanwhile, when the heater has a thickness greater than 100 µm, as the heater has an excessive volume to increase a volume of the entire battery pack, a capacity with respect to a volume of the battery may be reduced.

In an exemplary embodiment, a doubled-sided adhesive tape may be attached between the heater and the battery cell. Accordingly, although an external shock and a vibration are applied to the battery pack, a coupling structure of the battery cell array may be firmly maintained by the double-sided adhesive tape between the heater and the battery cell.

In an exemplary embodiment, the temperature sensor may include a thermistor.

In an exemplary embodiment, although the critical temperature may be set in a range of −40 C.° to 0 C.°, the critical temperature may be adjusted in consideration of the specification and performance of the battery.

The present disclosure also provide a battery pack having another structure. The battery pack may maintain the normal performance of the battery by increasing the temperature of the battery greater than a predetermined temperature to prevent the performance of the battery from being degraded when an electric vehicle travels at a low temperature environment.

In accordance with another exemplary embodiment, a battery pack includes: a base plate in which at least one module accommodation portion on which a plurality of battery modules are mounted is defined; at least one battery module assembly including a plurality of battery modules that are arranged adjacent to each other and mounted to the module accommodation portion; an assembly cooling member disposed between a lower portion of the battery module assembly and the base plate and through which a refrigerant flows horizontally to the ground so as to cool the battery modules configuring the battery module assembly; at least one heater mounted to a portion of an outer surface of the assembly cooling member; a battery management system (BMS) mounted to an upper end of the battery module assembly to control an operation of the battery modules; and a temperature sensor configured to measure a temperature of the battery modules to transmit the measured temperature to the BMS, in which, when the temperature of the battery cells, which is measured from the temperature sensor, is equal to or less than a critical temperature, the BMS provides a current to the heater to increase the temperature of the assembly cooling member.

As at least one heater is mounted to a portion of the outer surface of the assembly cooling member, and the current is provided to the heater to increase the temperature of the assembly cooling member when the temperature of the battery module, which is measured from the temperature sensor, is equal to or less than the critical temperature, the battery pack in accordance with another exemplary embodiment may increase the temperature of the battery equal to or greater than a predetermined temperature even when the electric vehicle having the battery pack in accordance with another exemplary embodiment as a power source travels in the low temperature environment, and accordingly, prevent the performance of the battery from being degraded to secure the normal output and the operation time.

In an exemplary embodiment, the heater may be mounted to an upper outer surface of the assembly cooling member in a portion that is not contact with the battery modules.

In an exemplary embodiment, the assembly cooling member may include: a heat transfer plate mounted to a lower end of the battery modules configuring the battery module assembly; and an assembly cooling plate mounted to a bottom surface of the heat transfer plate in a thermal contact state and having a hollow structure or a refrigerant pipe, through which the refrigerant flows.

In an exemplary embodiment, the battery module may include: two or more battery cells of which the same surfaces are stacked and arranged in the same direction as each other; frame members surrounding outer circumferential sides of the battery cells, respectively; and cooling members each having a plate shape and respectively facing to contact the battery cells; and one battery cell is mounted to one side of one frame member, and one cooling member is mounted to the other side thereof to configure a unit module.

In an exemplary embodiment, in the frame member, a locking part for being coupled to the frame member of the adjacent unit module may be provided on at least one outer circumferential side from among the rest of the outer circumferential sides except for the outer circumferential side corresponding to an electrode terminal of the battery cell.

In an exemplary embodiment, the locking part may include: a first coupling portion protruding in a direction in which the battery cells are stacked so as to be coupled to the frame member of the adjacent unit module by virtue of a hook structure; and a second coupling portion that is a recessed groove having a shape corresponding to the first coupling portion so that the first coupling portion of the frame member of another adjacent unit module is inserted and coupled thereto.

In an exemplary embodiment, the frame member may include an extended locking portion having a shape protruding outward from at least one corner to intensify locking with other frame members.

In an exemplary embodiment, an extended locking hole may be perforated in the extended coupling portion, and an extended locking tool may be inserted into the extended locking portions of the frame members to couple the frame members to each other.

In an exemplary embodiment, the heater may include a carbon heating film.

In an exemplary embodiment, the carbon heating film may include: a composite film having a sheet shape; and strip-type conductive terminals provided on both ends of the composite film in a width direction of the sheet In an exemplary embodiment, although the critical temperature may be set in a range of −40 C.° to 0 C.°, the critical temperature may be adjusted in consideration of the specification and performance of the battery and the temperature of the refrigerant.

In an exemplary embodiment, although a type of the battery cell is not particularly limited, a specific example of the batter cell may include a lithium secondary battery such as a lithium ion battery and a lithium ion polymer battery having high energy density, high discharge voltage, and output stability.

Generally, the lithium secondary battery includes a positive electrode, a negative electrode, a separator, and a non-aqueous electrolytic solution containing a lithium salt.

The positive electrode is manufactured, for example, by applying a mixture of a positive electrode active material, a conductive material, and a binder onto a positive electrode collector and then drying, and if necessary, a filler may be further added to the mixture.

Examples of the positive electrode active material may include: a layered compound such as a lithium cobalt oxide ($LiCoO_2$), and a lithium nickel oxide ($LiNiO_2$), or a compound substituted with one or more transition metals; a lithium manganese oxide such as $Li_{1+x}Mn_{2-x}O_4$ (where, x=0~0.33), $LiMnO_3$, $LiMn_2O_3$, and $LiMnO_2$; a lithium copper oxide ($Li_2CuO_2$); a vanadium oxide such as $LiV_3O_8$, $LiFe_3O_4$, $V_2O_5$, and $Cu_2V_2O_7$; a Ni-site type lithium nickel oxide expressed by a chemical formula $LiNi_{1-x}M_xO_2$ (where M=Co, Mn, Al, Cu, Fe, Mg, B, or Ga, and x=0.01~0.3); a lithium manganese composite oxide expressed by a chemical formula $LiMn_{2-x}M_xO_2$ (where M=Co, Ni, Fe, Cr, Zn, or Ta, and x=0.01~0.1) or a chemical formula $Li_2Mn_3MO_8$ (M=Fe, Co, Ni, Cu, or Zn); $LiMn_2O_4$ where a portion of the Li of the chemical formula is substituted with alkaline earth metal ions; a disulfide compound; and $Fe_2(MoO_4)_3$, but are not limited thereto.

Generally, the conductive material is added in an amount of 1 to 30 wt % with respect to the total weight of the mixture including the positive active material. The conductive material is not particularly limited as long as it has electrical conductivity without causing a chemical change in the corresponding battery. For example, the conductive material may include graphite such as natural graphite and artificial graphite; carbon black such as carbon black, acetylene black, Ketjen black, channel black, furnace black, lamp black, and thermal black; a conductive fiber such as a carbon fiber and a metal fiber; metal powder such as fluorocarbon, aluminum, and nickel powder; a conductive whisker such as a zinc oxide and potassium titanate; a conductive metal oxide such as a titanium oxide; and a conductive material such as a polyphenylene derivative.

The binder is a substance that assists in binding of the active material and the conductive material and binding to the collector, and generally added in an amount of 1 to 30 wt % with respect to the total weight of the mixture including the positive electrode active material. For example, the binder may include polyfluorovinylidene, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene-terpolymer (EPDM), sulfonated EPDM, stylene butylene rubber, fluoro rubber, and various copolymers.

The filler is a substance for suppressing expansion of the positive electrode and selectively used, and is not particularly limited as long as it is a fibrous material without causing a chemical change in the corresponding battery. For example, the filler includes an olefin-based copolymer such as polyethylene and polypropylene; and a fibrous material such as a glass fiber and a carbon fiber.

The negative electrode is manufactured by applying a negative electrode active material onto a negative electrode collector and then drying, and if necessary, substances described above may be further selectively included.

For example, the negative electrode active material may include: carbon such non-graphitized carbon and graphitized carbon; a metal composite oxide such as $Li_xFe_2O_3$ ($0 \leq x \leq 1$), $Li_xWO_2$ ($0 \leq x \leq 1$) and $Sn_xMe_{1-x}Me'_yO_z$ (Me: Mn, Fe, Pb, Ge; Me': Al, B, P, Si, Group I, II and III elements of the Periodic Table, halogen atoms; $0<x\leq1$; $1\leq y\leq3$; and $1\leq z\leq8$); a lithium metal; a lithium alloy; a silicon-based alloys; a tin-based alloy; a metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; a conductive polymer such as polyacetylene; and a Li—Co—Ni based material.

The separator and a separating film are interposed between the positive electrode and the negative electrode, and an insulating thin film having high ion permeability and mechanical strength is used as the separator and the separating film. The separator typically has a pore diameter of 0.01 to 10 μm and a thickness of 5 to 130 μm. For example, the separator includes: an olefin-based polymer such as polypropylene that has chemical resistance and hydrophobicity; and a sheet or a non-woven fabric made of a glass fiber and polyethylene. When a solid electrolyte such as a polymer is used as the electrolyte, the solid electrolyte may serve as the separator.

In addition, as a specific example, the separator and/or the separating film may be an organic/inorganic composite porous safety-reinforcing separator (SRS) in order to improve the safety of the battery.

The SRS separator may be manufactured by using inorganic particles and a binder polymer, as active layer substances, on a polyolefin-based separator base material. In this case, a uniform porous structure is provided by means of empty spaces (interstitial volumes) between the inorganic particles that are active layer substances in addition to a porous structure included in the separator base material itself.

In case of using the organic/inorganic composite porous separator, it is possible to suppress an increase in the thickness of the battery due to swelling during a formation process when compared to use a general separator. In addition, in case of using a polymer, which is gellable when impregnated in a liquid electrolytic solution, as a binder polymer substance, it may be used as an electrolyte at the same time.

Also, since the organic/inorganic composite porous separator is able to exhibit excellent adhesion properties by adjusting contents between the binder polymer and the inorganic particles that are substances of the active layer substances within the separator, an assembling process may be easily performed.

The inorganic particles are not specially limited as long as they are electrochemically stable. That is, the inorganic particles that may be used in the present disclosure are not specially limited as long as an oxidation and/or a reduction reaction are/is not generated within an operating voltage range (for example, 0-5 V with respect to Li/Li+) of the applied battery. Particularly, in case of using inorganic particles having an ability to transfer ions, a performance may be enhanced by increasing ionic conductivity within an electric chemical device. Therefore, it may be preferable that the ionic conductivity is as high as possible. Also, when the inorganic particles have a high density, it is difficult to disperse them during a coating process, and a weight increases when a battery is manufactured. Therefore, it may be preferable that the density is as low as possible. Also, in case that the inorganic matter has high permittivity, the ionic conductivity of the electrolytic solution may be enhanced by contributing to increase a dissociation rate of an electrolyte salt such as a lithium salt in the liquid electrolyte.

The non-aqueous electrolytic solution containing the lithium salt includes a polar organic electrolytic solution and the lithium salt. As the electrolytic solution, a non-aqueous liquid electrolytic solution, an organic solid electrolyte, and an inorganic solid electrolyte may be used.

For example, the non-aqueous electrolytic solution may include an aprotic organic solvent such as N-methyl-2-pyrrolidone, propylene carbonate, ethylene carbonate, butylene carbonate, dimethyl carbonate, diethyle carbonate, gamma-butyrolactone, 1,2-dimethoxy ethane, tetrahydroxy franc, 2-methyl tetrahydrofuran, dimethyl sulfoxide, 1,3-dioxolane, formamide, dimethyl formamide, dioxolane, acetonitrile, nitromethane, methyl formate, methyl acetate, phosphoric acid tri-ester, trimethoxy methane, a dioxolane derivative, sulfolan, methyl sulfolan, 1,3-dimethyl-2-imidazolidinone, a propylene carbonate derivative, a tetrahydrofuran derivative, ether, methyl propionate, and ethyl propionate.

For example, the organic solid electrolyte may include a copolymer including a polyethylene derivative, a polyethylene oxide derivative, a polypropylene oxide derivative, a phosphoric acid ester polymer, poly agitation lysine, polyester sulfide, polyvinyl alcohol, poly vinylidene fluoride, or an ionic dissociable group.

For example, the inorganic solid electrolyte may include a nitride, a halide, and a sulfate of the lithium, such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

For example, the lithium salt may include a material easily dissolved in the non-aqueous electrolyte, such as LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborane, lithium lower aliphatic carbonate, lithium 4-phenyl borate, imide, and the like.

Also, for example, the non-aqueous electrolytic solution may include pyridine, triethyl phosphite, triethanolamine, cyclic ether, ethylenediamine, n-glyme, hexaphosphoric triamide, a nitrobenzene derivative, sulfur, a quinone-imine dye, N-substituted oxazolidinone, N,N-substituted imidazolidine, ethylene glycol dialkyl ether, an ammonium salt, pyrrole, 2-methoxyethanol, and aluminum trichloride, which are added to the non-aqueous electrolyte in order to improve discharge and charge characteristics and flame retardancy. In some cases, a halogen-containing solvent such as carbon tetrachloride and ethylene trifluoride may be further included so as to provide non-combustibility, and a carbon dioxide gas may be further included so as to improve high-temperature storage characteristics.

In accordance with another exemplary embodiment, a device including the above-described battery pack as a power is provided.

The device may be a device selected from an electric vehicle, a hybrid electric vehicle, a plug-in hybrid electric vehicle, and a power storage device.

Since a structure and a manufacturing method are well known in the art, a detail description thereof will be omitted in this disclosure.

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

Hereinafter, although the present disclosure is further described with reference to the drawings in accordance with exemplary embodiments, the scope of the present disclosure is not limited thereto.

Figure 1:
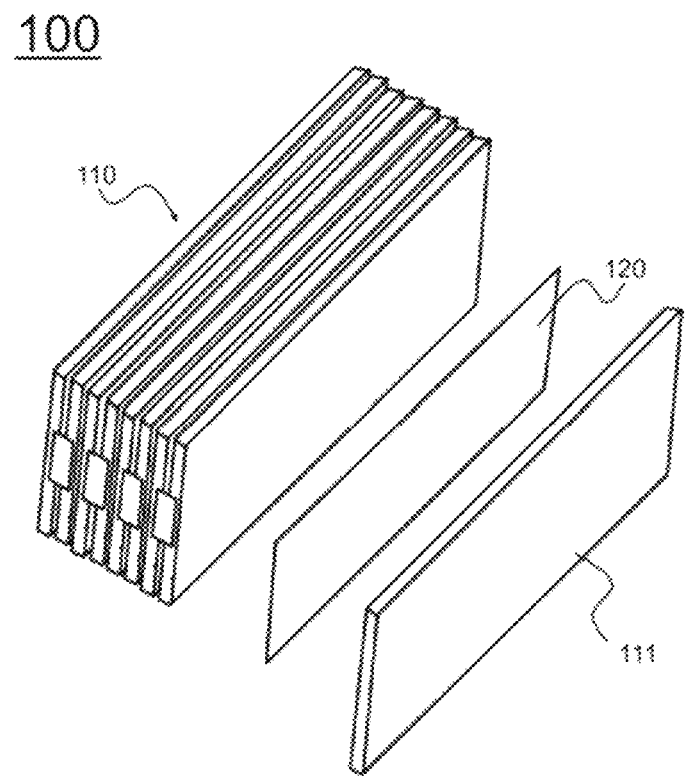
FIG. 1 is a perspective view of a battery pack in accordance with an exemplary embodiment.

FIG. 1 is a schematic perspective view of a battery pack in accordance with an embodiment.

Referring to FIG. 1, a battery pack 100 includes a battery cell array 110, a carbon heating film 120, BMS (not shown), and a temperature sensor (not shown).

The battery cell array 110 has a structure in which a plurality of battery cells 111 are arranged in a state in which side surfaces thereof face each other, and the carbon heating films 120 are disposed between the battery cells 111.

A double-sided adhesive tape (not shown) is attached between the carbon heating film 120 and the battery cell 111.

The BMS provides a current to the carbon heating film 120 to increase temperatures of the battery cells 111 when the temperatures of the battery cells 111, which is measured from the temperature sensor, is reduced below a critical temperature.

Figure 2:
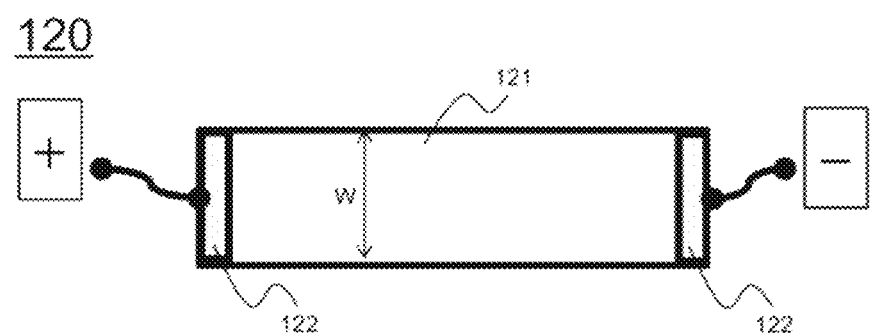
FIG. 2 is a plan view of a heater in FIG. 1.
Figure 3:
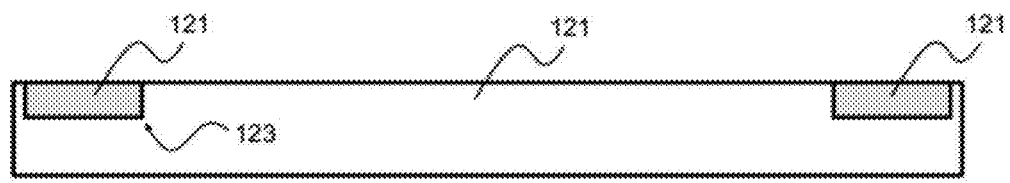
FIG. 3 is a vertical cross-sectional view of the heater in FIG. 2.

FIG. 2 is a schematic plan view of the heater in FIG. 1, and FIG. 3 is a schematic cross-sectional view of the heater in FIG. 2.

Referring to FIGS. 2 and 3, the carbon heating film 120 includes a composite film 121 and a strip-type conductive terminal 122.

The composite film 121 has a rectangular sheet shape, and the strip-type conductive terminals are provided on both ends of the composite film 121 in a width direction of the sheet.

Terminal recessed portions 123 at which the conductive terminal 122 is positioned are defined on a top surface adjacent to both ends of the composite film 121 in the width direction.

The carbon heating film 120 emits heat by a resistant heat of the composite film 121 when a current is applied to the conductive terminals 122.

Figure 4:
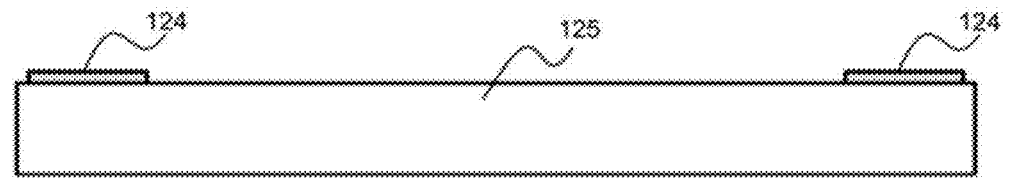
FIG. 4 is a vertical cross-sectional view of a heater in FIG. 2 in accordance with another exemplary embodiment.

FIG. 4 is a schematic vertical cross-sectional view of the heater in FIG. 2 in accordance with another embodiment.

Referring to FIG. 4, the strip-type conductive terminal 124 has a structure in which strip-type conductive terminal 124 is applied on both ends of the composite film 125 in the width (W) direction of the sheet.

Since the rest of the structure except for the structure in which the strip-type conductive terminals are formed on the composite film have the same structure as that of the heater described in FIG. 2, detailed description for this will be omitted.

Figure 5:
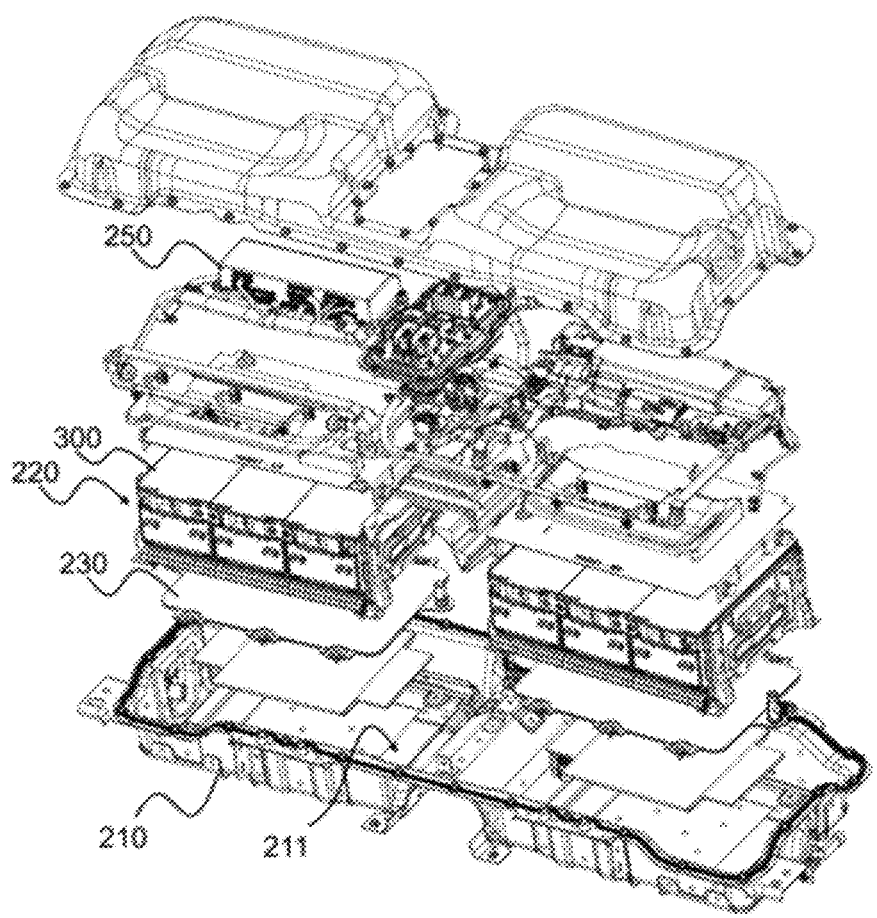
FIG. 5 is a perspective view of a battery pack in accordance with another exemplary embodiment.
Figure 6:
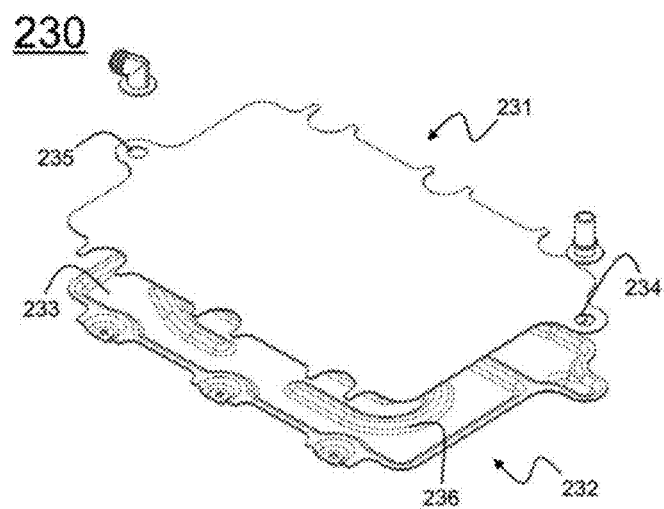
FIG. 6 is a perspective view of an assembly cooling member in FIG. 5.
Figure 7:
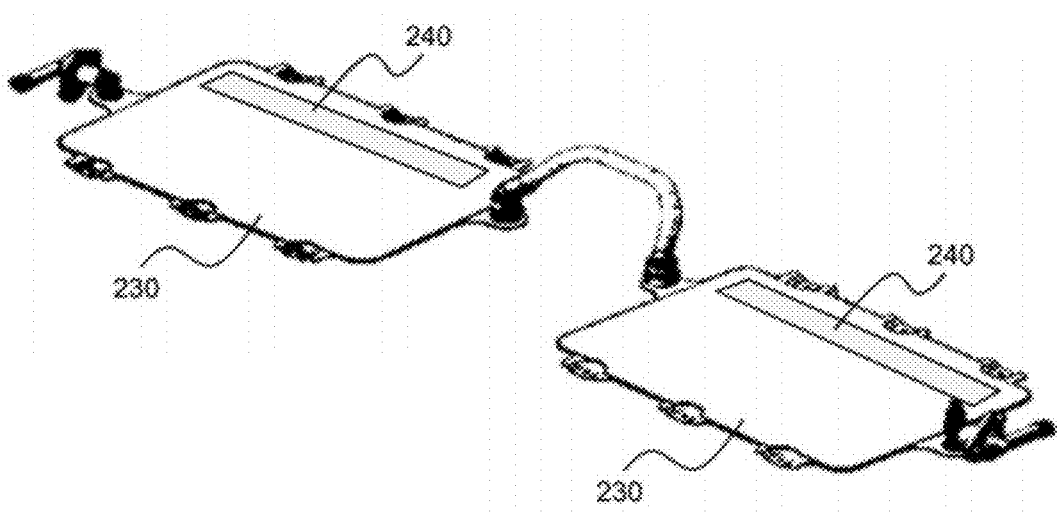
FIG. 7 is a perspective view of an assembly cooling member and a heater in FIG. 5.
Figure 8:
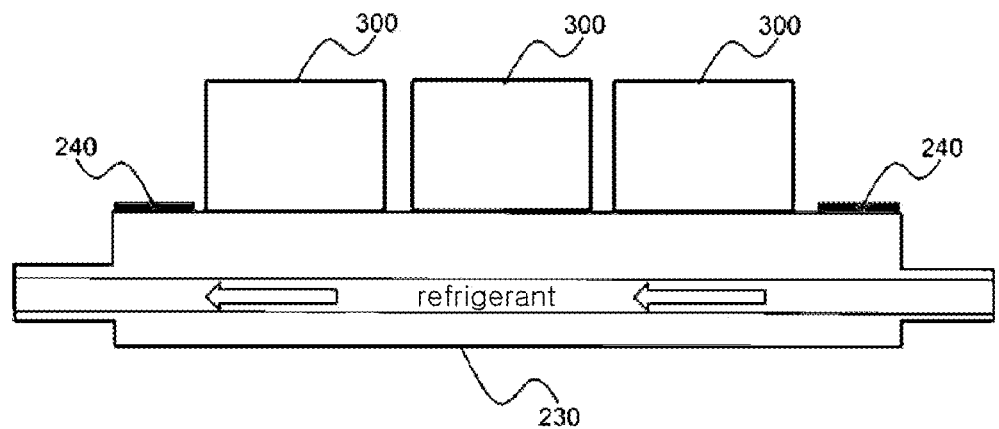
FIG. 8 is a side view of the battery module, the assembly cooling member, and the heater in FIG. 5.

FIG. 5 is a schematic exploded view of a battery pack in accordance with another embodiment, FIG. 6 is a schematic perspective view of an assembly cooling member in FIG. 5, FIG. 7 is a schematic perspective view of the assembly cooling member and the heater in FIG. 5, and FIG. 8 is a schematic side view of the battery module, the assembly cooling member, and the heater in FIG. 5.

Referring to FIG. 5 in conjunction with FIGS. 6 to 8, the battery pack 200 includes a base plate 210, a battery module assembly 220, an assembly cooling member 230, a carbon heating film 240, a BMS 250, and a temperature sensor (not shown). The base plate 210 has a module accommodation part 211 in which the battery modules 300 are mounted, and the battery module assembly 220 in which a plurality of battery modules 300 are arranged adjacent to each other is mounted on the module accommodation part 211.

The cooling member 230 is disposed between the base plate 210 and a lower portion of the battery module assembly 220 to cool the battery modules 300 configuring the battery module assembly 220.

The carbon heating film 240 is mounted on a top surface of the assembly cooling member 230, and the BMS 250 is mounted on the battery module assembly 220 to control an operation of the battery modules 300.

The BMS provides a current to the carbon heating film 240 to increase temperatures of the assembly cooling member 230 when the temperatures of the battery modules, which is measured from the temperature sensor, is reduced below a critical temperature. Accordingly, the temperature of the battery modules 300 increases.

The carbon heating film 240 is mounted on an outer surface of an upper portion of the assembly cooling member 230 in a portion that does not contact the battery modules 300.

The assembly cooling member 230 is disposed between a lower portion of the battery module assembly 220 and the base plate 210 and has a structure in which a refrigerant flows horizontally to the ground to cool the battery modules 300 configuring the battery module assembly 220.

The assembly cooling member 230 includes a heat transfer plate 231 mounted on a lower end of the battery modules 300 configuring the battery module assembly 220 and an assembly cooling plate 232 mounted on a bottom surface of the heat transfer plate 231 in a thermal contact state and having a refrigerant flow path through which the refrigerant flows.

An accommodation portion having a structure recessed from one surface to the other surface facing thereto of the assembly cooling plate 232 is defined in the assembly cooling plate 232, and an assembly refrigerant inlet and an assembly refrigerant outlet 234, which communicate with the accommodation portion 233, are defined in both outer circumferential sides that are disposed opposite to each other.

A plurality of beads 236 protrude in a direction of one surface on which the heat transfer plate 231 is disposed so as to define a refrigerant flow path having a shape of S and formed from the refrigerant inlet 234 to the refrigerant outlet 235 in the accommodation portion 233 of the assembly cooling plate 232.

Figure 9:
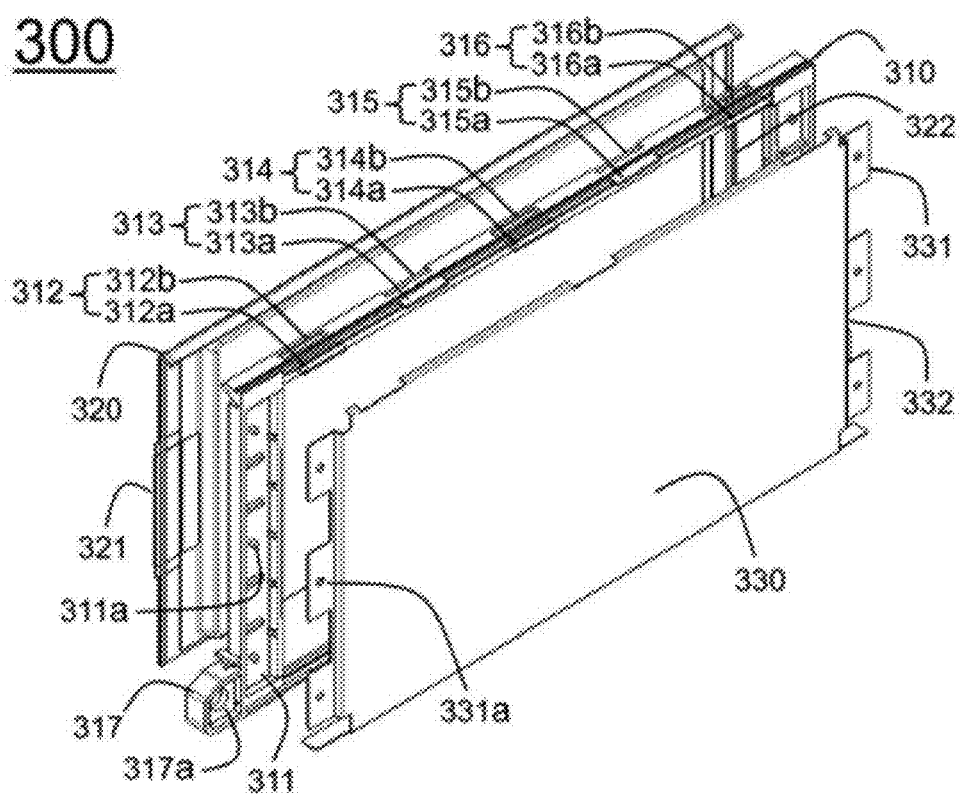
FIG. 9 is a schematic view illustrating a structure of a unit module configuring a battery module in FIG. 5.

FIG. 9 is a schematic view illustrating a structure of a unit module configuring a battery module in accordance with one exemplary embodiment.

Referring to FIG. 9, a unit module 300 includes one battery cell 320 mounted on one side of a frame member 310 and one cooling member 330 mounted on the other side facing thereto of the frame member 310.

The battery cell 320 includes a positive terminal 321 and a negative terminal 322, which are provided on both outer circumferential sides that are opposite to each other.

The cooling member 330 has a plate shape and is mounted in an opposite direction of the battery cell 320 with respect to the frame member 310 to face and contact the battery cell 320.

Three protruding portions 331 and two recessed portions 332 are repeatedly provided on an outer circumferential portion corresponding to the positive terminal 321 and the negative terminal 322 of the battery cell 320 of both ends of the cooling member 330 on a plane.

A coupling lock hole 331a for being coupled to the frame member 310 is perforated in the protruding portion 331 of the cooling member 330, and a coupling lock portion 311a inserted and coupled to the coupling lock hole 331 protrudes from a recessed-type locking portion 311 of the frame member 310 corresponding thereto.

Accordingly, the cooling member 330 is mounted such that the coupling lock portion 311a of the recessed-type locking portion 311 is inserted into the coupling lock hole 331a of the protruding portion 331 in a process in which the protruding portion 331 is coupled to the recessed type coupling portion 311 defined in the frame member corresponding thereto.

The frame member 310 has a hollow structure surrounding an outer circumferential side of the battery cell 320, and five locking parts 312, 313, 314, 315, and 316 are provided on one side outer circumferential side adjacent to the outer circumferential side corresponding to the electrode terminals 321 and 322 of the battery cell 320 among four outer circumferential sides.

Each of the locking parts 312, 313, 314, 315, and 316 includes first coupling portions 312a, 313a, 314a, 315a, and 316a and second coupling portions 312b, 313b, 314b, 315b, and 316b.

The first coupling portions 312a, 313a, 314a, 315a, and 316a protrude in the same manner in a direction corresponding to a position at which the battery cell 320 is mounted on the frame member 310, so as to be coupled by virtue of a hook structure.

The second coupling portions 312b, 313b, 314b, 315b, and 316b are recessed grooves corresponding to the first coupling portions so that first coupling portions of a frame member of another adjacent unit module are inserted and coupled.

Three first coupling portions 312a, 314a, 316a from among the first coupling portions 312a, 313a, 314a, 315a, and 316a have hooks heading in an outer direction of the frame member 310, and two first coupling portions 313a and 315a have hooks heading in an inner direction of the frame member 310 to which the battery cell 320 is mounted.

In the same manner, each of three second coupling portions 312b, 314b, 316b from among the second coupling portions 312b, 313b, 314b, 315b, and 316b has a structure recessed from the inner direction to the outer direction in correspondence to the first coupling portions 312a, 314a, 316a formed in the outer direction of the frame member 310, and each of two second coupling portions 313b and 315b has a structure recessed from the outer direction to the inner direction in correspondence to the first coupling portions 313a and 314a formed in the inner direction.

An extended locking portion 317 having an outward protruding shape is provided on a corner of an outer circumferential side corresponding to the positive terminal 321 and the negative terminal 322 of the battery cell 320 from among the outer circumferential sides of the frame member 310, and an extended locking hole 317a is perforated in the extended locking portion 317 so that an extended locking tool is inserted.

Figure 10:
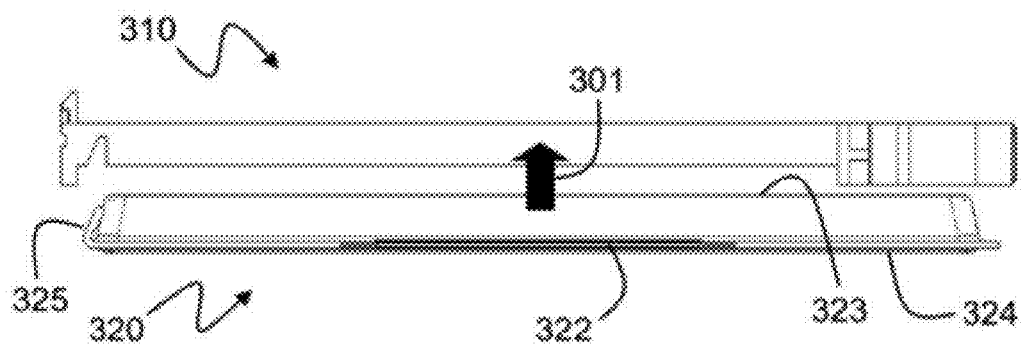
FIG. 10 is a schematic view illustrating a structure in which a battery cell in FIG. 9 is mounted to a frame member.

FIG. 10 is a schematic view illustrating a structure in which the battery cell 320 in FIG. 9 is mounted to the frame member 310.

Referring to FIG. 10, the battery cell 320 has a structure in which the accommodation portion 323 of the battery case is recessed from one surface to the other surface facing the one surface, and the opened one surface of the accommodation portion 323 is covered by a cover 324.

The battery cell 320 is mounted to the frame member 310 so that an outer surface of the accommodation portion 323 contacts the cooling member in a state in which a sealing portion 325 of the outer circumferential side of a side surface adjacent to the outer circumferential side on which the negative terminal 322 is provided is bent in a direction of an outer wall of the accommodation portion 323.

Accordingly, the unit module has a structure in which the cover 324 configuring the battery cell 320 is exposed in a direction of one surface, and the cooling member is exposed in a direction of the other surface corresponding to the one surface. Thus, the positive terminal and the negative terminal 322, which protrude from a portion biased in the direction of one surface on which the cover 324 of the battery case is positioned may easily extend in an outer direction of the frame member 310.

Figure 11:
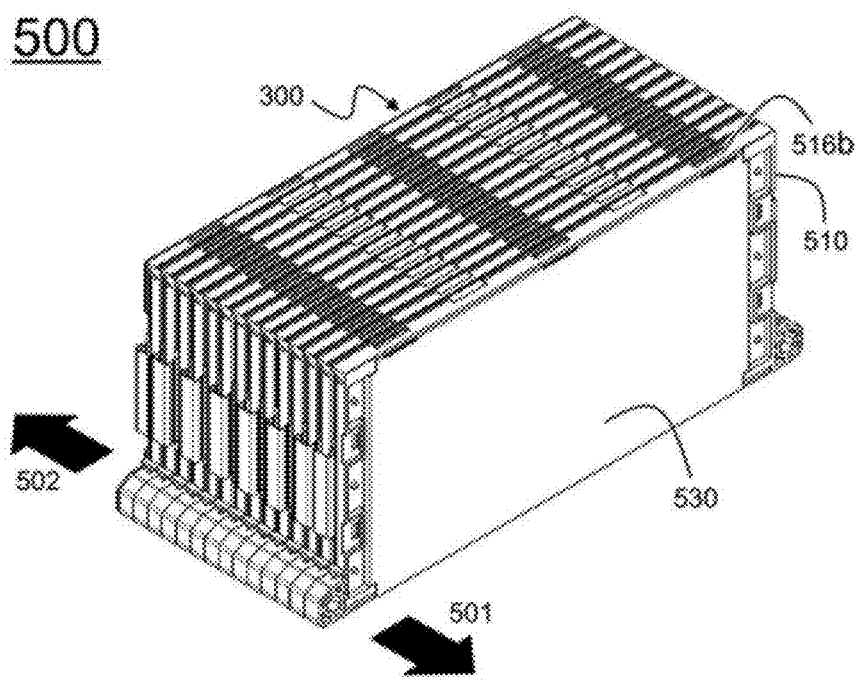
FIG. 11 is a schematic view illustrating a structure of a unit module laminate in which a plurality of unit modules in FIG. 9 are stacked and coupled to each other.

FIG. 11 is a schematic view illustrating a structure of a unit module laminate in which a plurality of unit modules in FIG. 9 are stacked and coupled.

Referring to FIG. 11, a unit module laminate 500 has a structure in which total 14 unit modules 300 are stacked with and coupled to each other.

In the unit module laminate 500, the accommodation portions of the battery case of the battery cells configuring the unit module 300 are stacked and arranged to face the same direction as each other.

Accordingly, from among outermost of the unit module laminate 500, the cooling member 530 is exposed from one surface, and the accommodation portion of the battery case is exposed from the other surface facing the one surface.

From among the frame members disposed at the outermost, the second coupling portion 516b is formed only in a direction 502 in which the frame member adjacent thereto is positioned on a side surface of the frame member 510 disposed in a direction corresponding to a protruding direction 501 of the first coupling portion.

Accordingly, a structural damage of the frame member 510, which may be generated due to the unnecessary protrusion of the first coupling portion may be prevented.

Figure 12:
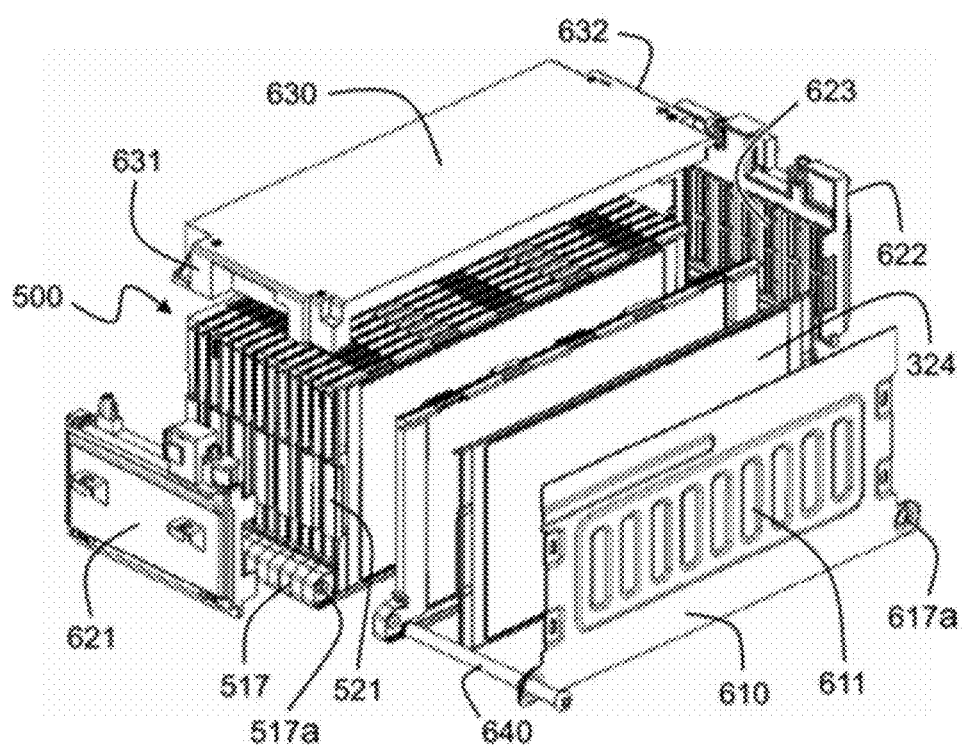
FIG. 12 is a schematic view illustrating a structure in which plates are mounted to the unit module laminate in FIG. 9.

FIG. 12 is a schematic view illustrating a structure in which plates are mounted to the unit module laminate in FIG. 11.

Referring to FIG. 12, plates 610, 621, 622, and 630 include an end plate 610, a first side surface plate 621, a second side surface plate 622, and an outer surface plate 630.

The end plate 610 is mounted on a surface from which the cover 324 of the battery case is exposed from among the outermost of a stacking direction of the unit modules configuring the unit module laminate 500.

A reinforcement beads 611 for rigidity are repeatedly formed on the end plate 610.

The end plate 610 has a corner, which outward protrudes, corresponding to the extended locking portion 517 of the unit module laminate 500 and a locking hole 617a corresponding to the extended locking hole 517a defined in the extended locking portion 517 of the unit module laminate 500 is perforated in the corner.

Accordingly, as the extended locking tool 640 is simultaneously inserted into the extended locking hole 517a of the unit module laminate 500 and the locking hole 617a of the end plate 610, the unit module laminate 500 and the end plate 610 may be coupled to each other.

The first side surface plate 621 and the second side surface plate 622 are mounted on both side surfaces, on which the electrode terminals 521 of the unit module laminate 500 are provided, in directions facing each other.

A busbar 623 for electrically connecting the electrode terminals 521 of the unit module laminate 500 is disposed on the first side surface plate 621 and the second side surface plate 622.

The outer surface plate 630 is mounted on a top surface of the unit module laminate 500, which is disposed adjacent to the end plate 610 and the side surface plates 621 and 622.

The outer surface plate 630 has outer circumferential sides 631 and 632 bent to extend toward the first side surface plate 621 and the second side surface plate 622 so as to surround and fix a portion of the first side surface plate 621 and the second side surface plate 622.

Accordingly, as a portion of the first side surface plate 621 and the second side surface plate 622, which is disposed adjacent to the outer surface plate 630, is stably fixed by the outer circumferential sides 631 and 632 of the outer surface plate 630, the structural stability may be enhanced.

As described above, as the heater is disposed between the battery cells and the current is provided to the heater to increase the temperature of the battery cells when the temperature of the battery cells, which is measured from the temperature sensor, is equal to or less than the critical temperature, the battery pack in accordance with an exemplary embodiment may increase the temperature of the battery equal to or greater than a predetermined temperature even when the electric vehicle having the battery pack in accordance with an exemplary embodiment as a power source travels in the low temperature environment, and accordingly, prevent the performance of the battery from being degraded to secure the normal output and the operation time.

Also, as at least one heater is mounted to a portion of the outer surface of the assembly cooling member, and the current is provided to the heater to increase the temperature of the assembly cooling member when the temperature of the battery module, which is measured from the temperature sensor, is equal to or less than the critical temperature, the battery pack in accordance with another exemplary embodiment may increase the temperature of the battery equal to or greater than a predetermined temperature even when the electric vehicle having the battery pack in accordance with another exemplary embodiment as a power source travels in the low temperature environment, and accordingly, prevent the performance of the battery from being degraded to secure the normal output and the operation time.

It will be apparent by those skilled in the art that various applications and modifications can be made thereto, on the basis of the above-descriptions, within the scope of the present disclosure.

What is claimed is:

1. A battery pack, comprising:
   a battery cell array in which a plurality of battery cells are arranged such that side surfaces thereof face each other;
   a heater disposed between two of the battery cells, the heater directly contacting one of the two battery cells, the heater being attached to the other of the two battery cells with a double-sided tape;
   a battery management system (BMS) configured to control an operation of the battery cells; and
   a temperature sensor configured to measure a temperature of the battery cells to transmit the measured temperature to the BMS,
   wherein, when the temperature of the battery cells, which is measured from the temperature sensor, is equal to or less than a critical temperature, the BMS provides a current to the heater to increase the temperature of the battery cells.

2. The battery pack of claim 1, wherein the heater comprises a carbon heating film.

3. The battery pack of claim 2, wherein the carbon heating film comprises:
   a composite film comprising a sheet shape; and
   strip-type conductive terminals provided on both ends of the composite film in a width direction of the sheet.

4. The battery pack of claim 3, wherein the carbon heating film emits heat due to resistance heat of the composite film when a current is applied to the conductive terminals.

5. The battery pack of claim 3, wherein terminal recessed portions, at which the conductive terminals are positioned, are defined in one surface adjacent to both ends of the composite film in the width direction of the sheet.

6. The battery pack of claim 3, wherein the strip-type conductive terminals are applied on the both ends of the composite film in the width direction of the sheet.

7. The battery pack of claim 1, wherein the heater has a thickness of 50 μm to 100 μm.

8. The battery pack of claim 1, wherein the critical temperature is set in a range of −40° C. to 0° C.

9. A battery pack, comprising:
   a base plate;
   at least one module accommodation portion on the base plate;
   a plurality of battery modules mounted in the at least one module accommodation portion;
   at least one battery module assembly comprising a plurality of battery modules that are arranged adjacent to each other and mounted to the at least one module accommodation portion;
   an assembly cooling member disposed between a lower portion of the battery module assembly and the base plate and through which a refrigerant flows horizontally to the ground to cool the battery modules configuring the battery module assembly;
   at least one heater mounted to a portion of an outer surface of the assembly cooling member;
   a battery management system (BMS) mounted to an upper end of the battery module assembly to control an operation of the battery modules; and
   a temperature sensor configured to measure a temperature of the battery modules to transmit the measured temperature to the BMS,
   wherein, when the temperature of the battery cells, which is measured from the temperature sensor, is equal to or less than a critical temperature, the BMS provides a current to the heater to increase the temperature of the assembly cooling member.

10. The battery pack of claim 9, wherein the heater is mounted to an upper outer surface of the assembly cooling member in a portion that is not in contact with the battery modules.

11. The battery pack of claim 9, wherein the assembly cooling member comprises:
   a heat transfer plate mounted to a lower end of the battery modules configuring the battery module assembly; and
   an assembly cooling plate mounted to a bottom surface of the heat transfer plate in a thermal contact state and having a hollow structure or a refrigerant pipe, through which the refrigerant flows.

12. The battery pack of claim 9, wherein:
   the battery module comprises:
      two or more battery cells of which the same surfaces are stacked and arranged in the same direction as each other;
      frame members surrounding outer circumferential sides of the battery cells, respectively; and
      cooling members each having a plate shape and respectively facing to contact the battery cells;
   one battery cell is mounted to one side of one frame member; and
   one cooling member is mounted to the other side of the one frame member to configure a unit module.

13. The battery pack of claim 12, wherein, in the frame member, a locking part for being coupled to the frame member of the adjacent unit module is provided on at least one outer circumferential side from among the rest of the outer circumferential sides, except for the outer circumferential side corresponding to an electrode terminal of the battery cell.

14. The battery pack of claim 13, wherein the locking part comprises:
   a first coupling portion protruding in a direction in which the battery cells are stacked to be coupled to the frame member of the adjacent unit module by a hook structure; and
   a second coupling portion that is a recessed groove having a shape corresponding to the first coupling portion so that the first coupling portion of the frame member of another adjacent unit module is inserted and coupled thereto.

15. The battery pack of claim 12, wherein the frame member comprises an extended locking portion having a shape protruding outward from at least one corner to intensify locking with other frame members.

16. The battery pack of claim 15, wherein:
   an extended locking hole is perforated in the extended coupling portion; and
   an extended locking tool is inserted into the extended locking portions of the frame members to couple the frame members to each other.

17. The battery pack of claim 9, wherein the heater comprises a carbon heating film.

18. The battery pack of claim 17, wherein the carbon heating film comprises:
   a composite film comprising a sheet shape; and
   strip-type conductive terminals provided on both ends of the composite film in a width direction of the sheet.

19. The battery pack of claim 9, wherein the critical temperature is set in a range of −40° C. to 0° C.

* * * * *